United States Patent [19]

Meszaros

[11] Patent Number: 4,917,706

[45] Date of Patent: Apr. 17, 1990

[54] LIQUID COMPOSITIONS OF PREREDUCED SULFUR DYES AND PRODUCTION THEREOF

[75] Inventor: Laszlo A. Meszaros, Charlotte, N.C.

[73] Assignee: Sandoz Ltd., Basle, Switzerland

[21] Appl. No.: 145,545

[22] Filed: Feb. 1, 1988

[51] Int. Cl.$^4$ .................. C09B 49/00; C09B 67/28
[52] U.S. Cl. ........................................ 8/652; 8/527; 8/650; 8/651; 8/918
[58] Field of Search .................. 8/652, 650, 651

[56] References Cited

U.S. PATENT DOCUMENTS

| | | | |
|---|---|---|---|
| 2,174,486 | 9/1939 | Chambers et al. | 8/571 |
| 3,532,455 | 10/1970 | Randvere | 8/652 |
| 4,218,219 | 8/1980 | Nagl et al. | 8/652 |
| 4,252,533 | 2/1981 | Heid et al. | 8/587 |
| 4,300,904 | 11/1981 | Blanchard | 8/532 |
| 4,322,214 | 3/1982 | Manabe et al. | 8/582 |

FOREIGN PATENT DOCUMENTS

| | | |
|---|---|---|
| 56-060349 | 5/1981 | Japan . |
| 57-161176 | 10/1982 | Japan . |
| 705936 | 3/1954 | United Kingdom . |

OTHER PUBLICATIONS

H. Zollinger, "Color Chemistry", (VCH), 1987, pp. 197–201.

*Primary Examiner*—A. Lionel Clingman
*Attorney, Agent, or Firm*—Gerald D. Sharkin; Richard E. Vila; Thomas C. Doyle

[57] ABSTRACT

Liquid compositions of sulfur dyes in reduced form are obtained by reducing a sulfur dye in an alkaline medium to which no sulfide reducing agent has been added, preferably employing a reducing sugar as reducing agent and a sulfur dye which has been washed to remove inorganic salts therefrom.

42 Claims, No Drawings

LIQUID COMPOSITIONS OF PREREDUCED SULFUR DYES AND PRODUCTION THEREOF

This invention relates to liquid compositions of prereduced sulfur dyes and to a process for producing such compositions.

The production of prereduced sulfur dyes comprises a plurality of steps and invariably at least one of these steps results in the presence of one or more salts in the product. For instance, sulfuric acid and hydrochloric acid are frequently used in condensation reactions for producing indophenol intermediates and also in the step whereby various sulfur dyes are precipitated from solution following the thionation (sulfurization) reaction. Such acids may produce salts by reacting with sodium sulfide and/or sodium hydroxide which are widely used in sulfur dye production. Salts such as sodium sulfide, copper sulfate and sodium chloride are often used during the thionation step which is an essential part of sulfur dye manufacture and salt may also be used to aid in the precipitation of the dye from solution. Furthermore, in the production of leuco sulfur dyes, sodium sulfide is frequently used as reducing agent. Other salts either introduced or produced at one stage or another in the production or prereduced sulfur dyes include sodium thiosulfate, sodium nitrite and sodium thiocyanate.

I have discovered that liquid compositions of prereduced sulfur dyes having significantly improved properties are obtained by a process wherein the amount of inorganic sulfides and preferably the amounts of all inorganic salts in the final liquid product are decreased.

The process of this invention comprises reducing a sulfur dye in an aqueous alkaline medium containing, as reducing agent for said dye, a reducing sugar and/or a sulfide which is formed in situ.

The alkali used to produce the dye liquid is usually an alkali metal hydroxide, carbonate or phosphate (e.g. tetrasodium pyrophosphate, trisodium phosphate or disodium phosphate) or sodium metabisulfite, preferably potassium hydroxide or sodium hydroxide, most preferably the latter. The amount of alkali should be sufficient to maintain an alkaline pH, usually in the range 9 to 12. Preferably, sufficient alkali is used to give a pH which is initially in the range 10 to 12 and which may fall slightly when a reducing sugar is used as discussed below, due to conversion of some reducing sugar to organic acid. The amount of alkali will normally range from about 2 to about 17%, particularly 4 to 13%, based on the total weight of the reaction mixture.

Preferably, the aqueous alkaline medium is heated to a temperature of 60° to 110° C., more preferably 80° to 95° C., to enhance the reducing activity of the reducing agent. Heating is preferably continued until a sufficient amount of the dyestuff is reduced so that at least 90%, preferably at least 95%, most preferably at least 99%, by weight, of the dyestuff becomes dissolved.

With some sulfur dyes, such as CI Sulfur Blacks 1 and 2, it has been found that sufficient reduction can be effected without adding any reducing agent to the alkaline medium. The alkali, such as sodium hydroxide, reacts with sulfur associated with the dye to form, in situ, sulfides such as sodium sulfide, sodium hydrogen sulfide and sodium polysulfides, which, in turn, reduce the dye and render it soluble in the aqeuous alkaline medium.

Preferably, a reducing sugar is included in the aqueous alkaline medium.

As the reducing sugar, there may be used any of those carbohydrates or combinations thereof which reduce Fehling solution, e.g. aldopentoses, such a L-arabinose, D-ribose and D-xylose, hexoses, such as D-glucose, D-fructose, D-mannose and D-galactose, and disaccharides, such as cellobiose, lactose and maltose. Products such as corn syrup, invert sugar and molasses, which contain reducing sugar, may also be used, as may dextrose prepared in situ from sucrose. The preferred reducing sugar is D-glucose.

The amount of reducing sugar will vary with the particular sulfur dye and the concentration thereof in the aqueous alkaline medium. Enough should be used to reduce the dye sufficiently to render it dissolved or miscible to the extend of at least 90% in the aqueous alkaline medium. Preferably, the amount of reducing sugar is sufficient to assure complete dissolution or miscibility of the dye in the dye liquid composition at any concentration and temperature at which the dye composition is likely to be stored or shipped. Typically, the amount of reducing sugar is in the range 3 to 25%, frequently 6 to 18%, based on the total weight of the reaction mixture. Based on the weight of dye, the amount of reducing sugar, when used, is usually in the range 12 to 110%, particularly 25 to 95%, more particularly 40 to 85%.

Preferably, no sodium sulfide or other sulfide reducing agent is added to the aqueous alkaline medium. More preferably, reducing sugars are the only reducing agents added during the preparation of the prereduced sulfur dye liquid. However, as a result of interaction of sulfur, which may be present as elemental sulfur or attached to the dye chromophore as a polythio group, with the alkali, as discussed above, and/or with electrons of the oxidation of the reducing sugar which takes place during the reduction of the dye, a small amount of sulfide, e.g., sodium sulfide, sodium polysulfide or sodium hydrogen sulfide, may be formed in situ. Depending on the amount of such sulfur, the inorganic sulfide content of the liquid dye product, as can be determined by known analytical techniques, e.g. by measuring the reduction equivalent of a sample of the liquid by potentiometric titration with 0.2N cupric ammonium sulfate solution, will vary. However, it should be no higher than 13%, based on the total weight of the composition, and is usually no higher than 10%, often no higher than 7%, by weight. When necessary, this may be controlled by regulating the amounts of alkali and especially of reducing sugar in the reaction medium. Alternatively, the amount of elemental sulfur may be lowered by known methods, such as by treating the oxidized thionation product with aqueous sodium sulfite to dissolve the sulfur, followed by filtration.

The sulfur dye used in the process of the invention may be any such dye obtained by the usual procedure of precipitating and isolating the product of a conventional thionation (sulfurization) reaction. Representative of such dyes are CI Sulfur Blacks 1, (Constitution No. 53185), 2 (Const. No. 53195) and 18, CI Sulfur Greens 2 (Const. No. 53571) and 36, CI Vat Blue 43 (Const. No. 53630), CI Sulfur Blues 7 and 13 (Const. Nos. 53440 and 53450), CI Sulfur Reds 10 (Const. No. 53228) and 14, CI Sulfur Brown 37 and CI Sulfur Yellow 22.

According to a preferred embodiment of the invention, the sulfur dye is one which has been washed to remove salts which are usually associated with such thionation products. Accordingly, a further aspect of the present invention is the step of washing a sulfur dye with water prior to introducing it into an aqueous alkaline medium to be reduced. Preferably, the wash water is at a temperature such as to most efficiently remove the salts without dissolving a significant amount of the dye, e.g. 20° to 70° C., more preferably 30° to 50° C. Preferably, the washing is carried out until the inorganic sulfate content, based on the weight of solids in the presscake, is less than 6%, especially less than 2%, more especially less than 0.6% by weight. More preferably, said percentages represent the maximum percentages of total inorganic salts. A convenient way to determine when the salt content is sufficiently low is by testing samples of the used wash water for electrical conductivity. The washing is continued until a sample of the wash water after washing shows a sufficiently low conductivity, preferably one which is close to or more preferably the same as that of the wash water prior to washing. A conductivity meter, such as a Chemtrix Type 700, may be used for this purpose. Using such an apparatus and washing with water having a conductivity of 60 to 80 micromhos/cm, good results are obtained when the washing is carried out until the used wash water shows a conductivity of 60 to 200, preferably 60 to 120 micromhos/cm. However, with a few sulfur dyes which exhibit some degree of water-solubility in the oxidized form, a somewhat higher conductivity reading, e.g. up to 400 micromhos, may be obtained due to the presence in the used was water of a small amount of dissolved dye in addition to inorganic salts. Preferably, the dye is one which, in oxidized form passes the following test: Disperse 5.0 g presscake in 10 cc water at room temperature by vibration in a Fischer Benchtop Ultrasonic Cleaner for 15 minutes. Filter the resulting dispersion through a 0.45 micron Metricel Membrane Filter, 47 mm diameter, (Millipore Corp.) at No. XX 10047 00. The filtrate should have no color.

As indicated above, the thionation and precipitation steps whereby the sulfur dyes used in the process of this invention are produced are conventional. The thionation reaction may, for instance, be carried out as disclosed in the Colour Index, volume 4, third edition (1971), page 4475 to 4501. As is clear from this reference, a wide variety of organic compounds can be used as starting materials. The thionating agent is usually sulfur or an alkali metal polysulfide. The thionation may be effected by baking or by refluxing the reactants in a liquid medium, such as water or a lower alcohol, e.g. ethanol or butanol. If necessary, particularly where thionation has been effected by baking, the product is dissolved in aqueous sodium sulfide or caustic, usually at elevated temperatures.

Precipitation is effected by treating the thionation product in an aqueous medium with a sufficient amount of an oxidizing agent or an acid or both to precipitate the sulfur dye. Any oxidizing agent known to be useful in this art may be employed, such as sodium nitrite, hydrogen peroxide, oxygen or air. Suitable acids include sulfuric acid and hydrochloric acid. The amount of oxidizing agent and/or acid will vary depending on the nature of the particular thionation product, e.g. the particular dye produced and the amount of sulfides present. Preferably it will be sufficient to completely precipitate the sulfur dye.

Preferably, the sulfur dyes used in the present invention are precipitated by oxidation. More preferably, the oxidation is carried out until the oxidation mass is free of sodium sulfide, sodium hydrogen sulfide and sodium polysulfides, as can be determined by known analytical methods, e.g. potentiometric titration of a water-diluted sample thereof with 0.2N cupric ammonium sulfate solution. Most preferably, the thionation product is diluted with water and aerated at about 60° to 90° C. until complete precipitation of the dye occurs.

It may, on occasion, be advantageous to add a salt, such a sodium chloride, to promote precipitation of the dye, as disclosed in the description of CI Sulfur Blue 11 (Constitution No. 53235) at page 4487 of the aforementioned Colour Index.

The precipitated sulfur dye is isolated by conventional methods, e.g. filtration, and preferably washed as discussed above.

In addition to the dye, alkali, reducing sugar and water, there may be included in the dye liquid an agent which further increases the solubility of the reduced dye therein. Once the precipitated dye has been separated from the residue of the thionation reaction mixture and preferably washed, it is further preferred to avoid adding thereto any ionic components. Therefore, the solubilityincreasing agent is advantageously nonionic. Suitable for this purpose are nonionic hydrotropic agents, such as ethylene glycol, diethylene glycol, polyethylene glycol, diethylene glycol mono- and di-($C_{1-4}$alkyl)ethers, propylene glycol and urea, as well as triethanolamine. The preferred hydrotrope is diethylene glycol. This component is used in an amount of about 3 to 35%, usually 4 to 22%, based on the total weight of the dye liquid composition.

The order of addition of the components is not critical. All of the components, i.e. dye, reducing sugar, alkali, water and optical solubility-increasing agent may be mixed together and then heated. Preferably, however, the components other than the reducing sugar are combined and heated to 60° to 110° C., preferably 80° to 95° C., and the reducing sugar is then added. Heating is continued, preferably with agitation, until all of the components have gone into solution.

According to a further preferred embodiment, the sulfur dye reduction of this invention is effected under an inert atmosphere, such as nitrogen. Preventing contact to the dye liquid with oxygen increases the efficiency of the reduction and lowers the requirements of reducing sugar and alkali, thus permitting higher concentrations of dye in the final product.

In some instances it may be desirable to control the reduction conditions in order to avoid the co-production of an excessive amount of sulfides, such as sodium sulfide. This may result in a small portion, e.g. up to 10%, preferably no more than 5%, by weight of the dye remaining undissolved. In such instances it is advantageous to subject the prereduced sulfur dye liquid to a final clarification step. This can be achieved by filtering the liquid, preferably while still at or near the temperature at which the reduction is effected. More preferably, a filtration aid, such as a diatomaceous earth or activated charcoal is added to the liquid with stirring and the liquid is filtered. The amount of such filtration aid may vary over a broad range, but is usually 1 to 12%, preferably 2 to 6%, by weight, based on the weight of the dye liquid.

The liquid compositions of prereduced sulfur dyes prepared by the above-described process also constitute part of the present invention. Preferably, the inorganic sulfide content of such compositions does not exceed 13%. Frequently it does not exceed 10%, or even 5%, based on the total weight of the composition. Typically, the inorganic sulfide content is in the range 0 to 12%, especially 0.5 to 9%, often 1 to 5%, based on the total weight of the liquid dye composition. Based on the weight of prereduced sulfur dye, the inorganic sulfide content is usually in the range 0 to 80%, particularly 5 to 60%, especially 10 to 50%. Preferably, the compositions contain less than 3%, more preferably less than 1.5%, especially less than 0.4%, more especially less than 0.1%, by weight, inorganic sulfates, more preferably less than said percentages of total inorganic salts other than sulfides.

The sulfur dye content of the compositions preferably exceeds 9%, by weight, and, more preferably, is in the range 12 to 40%, especially 15 to 36%, by weight. Typically, a composition of this invention further contains 3 to 25%, particularly 6 to 18% reducing sugar and/or oxidized derivatives thereof, 2 to 17%, particularly 4 to 12% alkali metal hydroxide or carbonate (sufficient to give a pH of about 9 to 12), 22 to 55% water and, when present, about 2 to 35%, particularly 4 to 22% solubility-increasing agent, by weight.

Since all ionic components, except the dye and a necessary amount of alkali to establish a satisfactory pH, are either drastically reduced or completely eliminated, the above formulation results in a unique dye liquid in which the ionic character of the dye solution is substantially reduced and, rather, a nonionic (or organic liquid) behavior predominates when such liquid is applied to a fabric.

The sulfur dye compositions of this invention provide several advantages.

Their low content of inorganic sulfides, e.g. sodium sulfide, sodium hydrogen sulfide and sodium polysulfides, reduces unpleasant odors, decreases the danger of hydrogen sulfide formation, lessens the need for effluent treatment and reduces the loss of tensile strength (tendering) of cotton fabrics dyed with black sulfur dyes.

Because sulfur dyes have high molecular weights and contain as solubilizing groups only thiol groups, they have limited solubility in water. Therefore, the presence of salt has a powerful salting out effect on the dye. The low inorganic salt content of the instant compositions gives them improved stability during shipping and storage. They are stable for at least 24 hours and preferably longer than 48 hours at −6° C. While the compositions may contain limited amounts of inorganic sulfides, as discussed above, it is believed that in such controlled amounts these sulfides may enhance the stability of the compositions by supplementing the reducing power of the reducing sugar.

Their low salt content also enables the compositions of this invention to have a high content of dye.

Because of the decreased tendency to be salted out, the dyes of these compositions exhibit improved penetration. During the initial penetration phase of an exhaust dyeing process the dyes become more evenly distributed throughout the fiber before salt is added to cause them to exhaust onto the fiber. This reduces the likelihood of the dye precipitating onto the fibers prematurely, resulting in less even distribution and an undesirable "bronzing" effect.

The compositions of the present invention also show a more moderate affinity or substantivity for cellulosic materials. Consequently, they can be used in continuous dyeing of cotton and cotton/polyester to give level dyeings which are characterized by the absence of side-center-side cross shading and minimal tailing properties.

The liquid dye compositions of this invention can be used to dye or print substrates dyeable with leuco sulfur dyes, such as cellulosics and blends thereof with other fibers, such as polyester, by methods which are conventional for dyeing or printing with previously known prereduced (leuco) sulfur dye liquids, as disclosed, for example in the Colour Index, volume 3, third edition (1971) page 3649. Dyeing methods for which the dye liquids are useful include exhaust methods, such as, beam, jig, package, beck or jet dyeing, as well as continuous methods, e.g. pad-steam, pad-dry-pad-steam or pad-dry-thermosol-pad-steam.

The amount of liquid dye composition added to the dyebath or printing paste will depend upon the dye content of the particular liquid being employed and the desired characteristics of the dyeing or printing and is within the skill of the art to determine. In general, about 7 to 170, preferably about 35 to 130 grams of dye liquid are added per liter of dyebath.

While the amount of reducing agent included in the dye liquid during its preparation is usually sufficient to assure good dissolution of the dye in the dyebath, it is sometimes advantageous to add a supplemental portion of reducing agent to the dyebath. Such reducing agents includes the compounds conventionally employed for this purpose, such as sodium sulfide, sodium hydrogen sulfide, sodium polysulfide, sodium hydrosulfite or sodium formaldehyde sulfoxylate. However, the preferred supplemental reducing agents are the reducing sugars discussed above, especially glucose. The amount of such optional supplemental reducing agent should be sufficient to assure complete dissolution of the dye in the dyebath and uniform and reproducible dyeings. It is well within the skill of the art to determine a suitable amount, depending on the particular dye liquid and reducing agent being used and the dyeing conditions. Typically, the amount is in the range 7 to 120 preferably 30 to 60 grams per liter of dyebath.

Preferably, a supplemental portion of alkali, such as sodium or potassium carbonate or hydroxide is also added to the dyebath with the reducing agent, e.g. in an amount of about 3.5 to 60, preferably 5 to 30 grams per liter.

A wetting agent may also be added to improve the penetration of the dye liquor into the substrate, e.g. in an amount of 1.9 to 15 grams per liter.

Following application of the dye to the substrate it is usually advantageous to subject the thus-treated substrate to an oxidation step to further improve the fastness of the dyeing. While some dyeings may become sufficiently oxidized by the water-rinsing step which normally follows the dyeing, it is preferably to carry out a chemical oxidation. For this purpose there may be used a combination of hydrogen peroxide and acetic acid or a catalyzed sodium bromate system.

In the following examples, which illustrate the invention, parts and percentages are by weight and temperatures are in Centigrade degrees.

EXAMPLE 1

Three hundred eighty-two grams of crude thionation mass of CI Leuco Sulfur Blue 13 (CI 53450) prepared by the usual thionation technique are dissolved in 800 g water and the resulting solution is aerated at 68°–70° for 6 hours, whereby the dyestuff completely precipitates from the solution. The precipitated dyestuff is filtered and the filter cake is washed with tap water at ambient temperature until a sample of wash water shows no increase in conductivity from before washing to after washing. The yield is 349.4 g filter cake with a solids content of 25.4%.

Fifty-seven grams of filter cake prepared as described above, 18 g diethylene glycol, 10 cc water and 16 g 50% sodium hydroxide liquid are mixed together and heated to 80°. The mixture is then heated at 85° under a nitrogen atmosphere and 11 g glucose are added gradually with stirring. Heating is discontinued after 25 minutes. A stable liquid dye composition having a sulfide content of 6.5% and a pH 10.9 is obtained in a yield of 110.3 g.

EXAMPLE 2

Four hundred grams of crude thionation mass of CI Leuco Sulphur Red 10 (CI 53228) prepared by the usual thionation technique are dissolved in 3000 cc water at about 50° and the solution is heated to 70°–75° and aerated at that temperature for 6 hours. The sulfide content of the resulting oxidation mass is 0, as determined by potentiometric titration with 0.2N cupric ammonium sulfate solution. The precipitated dye is isolated by filtration and the filter cake is washed with tap water having a conductivity of about 60 micromhos/cm until the used wash water shows a conductivity of about 95 micromhos/cm. The resulting presscake weighs 273.5 g and has a solids content of 63.0%.

44.9 grams of the above-prepared filter cake, 30.0 g. diethylene glycol and 23.0 g. 50% sodium hydroxide are mixed together and heated at 85° under a nitrogen atmosphere while 4.0 g glucose are added gradually with stirring. After 30 minutes 2 grams of Filteraid 4200 FW50, a diatomaceous earth filtering aid, are added and the liquid is stirred for two minutes and filtered through 11 cm Fischer filter paper. A stable liquid dye composition having a sulfide content of 11% and a pH 11.1 is obtained in a yield of 100.0 g.

EXAMPLE 3

Over a period of 20 minutes 192 g crude thionation melt of CI Leuco Sulfur Yellow 22 are added to a mixture of 180 cc water and 330 g sodium hydroxide 50% solution while said mixture is heated at a temperature of 115°–120°. Heating is continued at 120° for 2 hours while keeping the column constant. The resulting mixture is diluted to 1500 cc with additional water and 200 g. sodium chloride are added thereto. The resulting mixture is aerated at 85° for 58 hours, until the sulfide content is 0, and then cooled to room temperature. The pH is then adjusted to 6.0 by addition of 36.4 g sulfuric acid 75% solution and the resulting mixture is stirred overnight at room temperature. It is then filtered and the filter cake is washed with 14 liters tap water at 40° until the conductivity of the used wash water is 82 micromhos/cm. The yield is 666.0 g presscake having a solids content of 11.2%.

A mixture of 84.0 g of the above-prepared presscake and 12.0 g sodium hydroxide (50% solution) is heated to 75° under a nitrogen atmosphere. Six grams glucose are added and heating is continued at 85° for 30 minutes. The resulting liquor is filtered through 11 cm Fischer filter paper to give 101.0 g liquid dye having a sulfide content of 1.18% and a pH of 11.6.

EXAMPLE 4

A mixture of 200 grams of CI Sulfur Black 2 (CI 53195) presscake and 2 liters of water is stirred at room temperature for 30 minutes and then filtered. The filtrate is washed with 16 liters tap water at 50°. The final used wash water has a conductivity of 300 micromhos/cm due to the presence of a small amount of dissolved dye therein. There is obtained 165.9 g of presscake having a solids content of 60.1%.

A 46.6 g portion of the above-prepared presscake is mixed with 20 g aqueous sodium hydroxide (50%) and 15 cc water and heated at 90° for 40 minutes under a nitrogen atmosphere. A stable liquid dye composition having a sulfide content of 7.94% and a pH 11.4 is obtained in a yield of 80 g.

EXAMPLE 5

A mixture of 963 g thionation mass of CI Leuco Sulfur Blue 7 (CI 53440) and 2000 g water is aerated at 85° for 14 hours until the sulfide content is 0 and the dye is completely out of solution. The resulting slurry is filtered and the filter cake is washed with 3 liters water at 50°. The filter cake is then mixed with 2 liters water at 50° and 100 g sodium sulfite are added thereto. The resulting mixture is heated at 72° for 2 hours to effect further desulfurization and then filtered. The filter cake is washed with 10 liters water at 50°. Yield: 533 g.

Seventy-seven grams of the above-prepared filter cake having a solids content of 91.7%, 30 g diethylene glycol, 25 g aqueous sodium hydroxide (50%) and 50 cc water are mixed together and heated to 88° under a nitrogen atmosphere. Twenty grams glucose are added and heating is continued for 20 minutes. A liquid dye composition having a sulfide content of 5.15% and a pH 11.1 is obtained in a yield of 200 g.

EXAMPLE 6

A mixture of 250 parts crude thionation mass of the green leuco sulfur dye prepared according to Example 1 of U.S. Pat. No. 3,338,918 and 488 parts water is aerated at 88° for 2 hours, cooled to 45° and filtered. The filter cake is washed with 12,000 parts tap water until the washing liquid is clear and has a conductivity of 110 micromhos/cm. A presscake having a weight of 55 parts and a solids content of 43.2% is obtained.

A 6.5 part portion of the above-prepared presscake, 2.0 parts water, 2.0 parts diethylene glycol and 2.2 parts sodium hydroxide 50% solution are mixed together and heated to 78° under a nitrogen atmosphere. 1.2 parts of glucose are added and the mixture is stirred at 85° for 30 minutes. The resulting liquid is filtered through 11 cm Fischer filter paper and there is obtained 13,7 parts of a green liquid dye composition having a pH 11.5 and a sulfide content of 4.2%.

APPLICATION EXAMPLE

Ten grams of the dye liquid prepared according to Example 1 and 50 cc water are stirred together until a clear solution is obtained. To this solution are added 8 g glucose, 4 g NaOH 50% liquid, 10 additional cc water and 0.5 g Penetrant EH (anionic phosphate ester). The resulting mixture is stirred for 5 minutes and then diluted to 133 cc with additional water.

The above prepared dyeing solution is heated to 43° and poured into a dye pan. Pre-bleached cotton twill cloth is padded through the dyeing solution to a wet pick-up of 70–80%, steamed for 60 seconds at 101°–103° and then rinsed with warm tap water.

An oxidizing solution is prepared by adding 7.5 g hydrogen peroxide (35% solution) and 7.5 glacial acetic acid to sufficient water to give a total volume of one liter. This solution is heated to 60° and the above-dyed substrate is added and the solution is stirred for 30 seconds. The substrate is then rinsed with warm tap water until clean and then dried.

I claim:

1. A process for producing a liquid composition of a sulfur dye in pre-reduced leuco form which comprises washing a sulfur dye which has been obtained by precipitation from a thionation reaction product with water to remove inorganic salts therefrom and reducing the washed sulfur dye by heating it in an aqueous alkaline medium which contains, as the reducing agent for the sulfur dye, a reducing sugar or a sulfide which is formed in situ and to which no sulfide reducing agent has been added, the heating being continued until at least 90%, by weight, of the dye becomes dissolved.

2. A process according to claim 1 wherein a reducing sugar is present in the aqueous alkaline medium.

3. A process according to claim 1 wherein the sulfur dye is one obtained by oxidizing in an aqueous medium the product obtained by thionating an organic compound.

4. A process according to claim 1 wherein the aqeuous alkaline medium also contains a nonionic hydrotropic agent.

5. A process according to claim 1 which comprises heating the sulfur dye in the aqueous alkaline medium to a temperature in the range 60° to 110° C.

6. A process according to claim 2 wherein the reducing sugar is D-glucose.

7. A process according to claim 5 wherein the aqueous alkaline medium is heated under an inert atmosphere.

8. A process according to claim 1 wherein the washing of the precipitated sulfur dye is carried out until it contains less than 6% inorganic sulfates based on the total weight of solids.

9. A process according to claim 8 wherein the washing of the precipitated sulfur dye is carried out until it contains no more than 2% inorganic salts based on the total weight of solids.

10. A process according to claim 8 wherein the washing is effected until the dye contains less than 2% inorganic sulfates based on the total weight of solids.

11. A process according to claim 1 wherein a reducing sugar is the only reducing agent added to the aqueous alkaline medium.

12. A process according to claim 1 wherein the washing of the precipitated sulfur dye is carried out until it contains less then 0.6% inorganic sulfates based on the total weight of solids.

13. A process according to claim 1 wherein the washing of the precipitated sulfur dye is carried out until it contains no more than 0.6% inorganic salts based on the total weight of solids.

14. A process according to claim 1 which comprises heating the sulfur dye in the aqueous alkaline medium to a temperature in the range 80° to 95° C.

15. A process according to claim 1 wherein the sulfur dye is one obtained by aerating in an aqueous medium the product obtained by thionating an organic compound.

16. A process according to claim 2 wherein the reducing sugar is used in an amount sufficient to effect complete dissolution of the dye in the aqueous alkaline medium.

17. A process according to claim 2 wherein a reducing sugar is the only reducing agent added to the aqueous alkaline medium.

18. A process according to claim 2 wherein the reducing sugar is selected from the group consisting of aldopentoses, hexoses and disaccharides.

19. A process according to claim 2 wherein the washing of the sulfur dye is carried out until it contains no more than 2% inorganic salts based on the total weight of solids.

20. A process according to claim 17 wherein the washing of the sulfur dye is carried out until it contains no more than 2% inorganic salts based on the total weight of solids.

21. A process according to claim 20 wherein the reducing sugar is selected from the group consisting of aldopentoses, hexoses and disaccharides and is used in an amount sufficient to effect complete dissolution of the dye in the aqueous alkaline medium.

22. A process according to claim 21 which comprises heating the sulfur dye in the aqueous alkaline medium to a temperature in the range 60° to 110° C. under an inert atmosphere.

23. A process according to claim 22 wherein the reducing sugar is D-glucose.

24. A process according to claim 17 which comprises aerating in an aqueous medium a sulfur dye product of a thionation reaction until complete precipitation of the dye occurs, isolating the precipitated dye by filtration, washing the isolated dye with water at a temperature of 20° to 70° C. until the used wash water has a conductivity up to 140 micromhos/cn higher than that of the unused wash water and reducing the washed dye in an aqueous alkaline medium at a temperature of 60° to 100° C. under an inert atmosphere, said aqueous alkaline medium containing, as the only reducing agent added thereto, D-glucose in an amount sufficient to effect complete dissolution of the dye therein.

25. A process according to claim 1 wherein the sulfur dye is obtained by oxidizing a product of a thionation reaction until the oxidation mass is free of sodium sulfide, sodium hydrogen sulfide and sodium polysulfides.

26. A process according to claim 17, wherein the sulfur dye is obtained by oxidizing a product of a thionation reaction until the oxidation mass is free of sodium sulfide, sodium hydrogen sulfide and sodium polysulfides.

27. A process according to claim 22 wherein the sulfur dye is obtained by oxidizing a product of a thionation reaction until the oxidation mass is free of sodium sulfide, sodium hydrogen sulfide and sodium polysulfides.

28. A liquid composition of a sulfur dye in pre-reduced leuco form produced by the process of claim 1.

29. A liquid composition of a sulfur dye in pre-reduced leuco form produced by the process of claim 2.

30. A liquid composition of a sulfur dye in reduced leuco form produced by the process of claim 19.

31. A liquid composition of a precipitated sulfur dye in reduced leuco form produced by the process of claim 22.

32. An aqueous composition of a dissolved precipitated sulfur dye in pre-reduced leuco form wherein the concentration of inorganic sulfides is less than 10%, by weight, and the concentration of inorganic sulfates is less than 3%, by weight.

33. A composition according to claim 32 wherein the concentration of inorganic sulfides is less than 7%, by

34. A composition according to claim 32 wherein the concentration of inorganic sulfides is no more than 5%, by weight, and the concentration of total inorganic salts other than sulfides is less than 0.4%, by weight.

35. A composition according to claim 32 wherein the concentration of pre-reduced sulfur dye is in the range 12 to 40%, by weight.

36. A liquid composition according to claim 29 wherein the concentration of inorganic sulfates is less than 3%, by weight.

37. A composition according to claim 36 wherein the concentration of inorganic sulfates is less than 1.5%, by weight, and the concentration of inorganic sulfates is less than 1.5%, by weight.

38. A composition according to claim 37 which is essentially free of inorganic salts other than sulfides.

39. A composition according to claim 36 wherein the concentration of pre-reduced sulfur dye is in the range 12 to 40%, by weight.

40. A composition according to claim 35 wherein the content of the inorganic sulfates is less than 1.5%, by weight, and the content of inorganic sulfides is no more than 5%, based on the total weight of the composition.

41. A method of dyeing or printing a textile substrate which comprises applying thereto a composition according to claim 25.

42. A method of dyeing or printing a textile substrate which comprises applying thereto a composition according to claim 32.

* * * * *

REEXAMINATION CERTIFICATE (1950th)

United States Patent [19]

Meszaros

[11] B1 4,917,706

[45] Certificate Issued Mar. 16, 1993

[54] LIQUID COMPOSITIONS OF PREREDUCED SULFUR DYES AND PRODUCTION THEREOF

[75] Inventor: Laszlo A. Meszaros, Charlotte, N.C.

[73] Assignee: Sandoz Ltd., Basel, Switzerland

Reexamination Request:
No. 90/002,421, Aug. 30, 1991

Reexamination Certificate for:
Patent No.: 4,917,706
Issued: Apr. 17, 1990
Appl. No.: 145,545
Filed: Feb. 1, 1988

[51] Int. Cl.$^5$ .............. C09B 49/00; C09B 67/28
[52] U.S. Cl. .............................. 8/652; 8/527; 8/650; 8/651; 8/918
[58] Field of Search ............. 8/652, 650, 651, 527

[56] References Cited

U.S. PATENT DOCUMENTS

| | | | |
|---|---|---|---|
| 2,558,245 | 6/1951 | Grant | 8/611 |
| 4,917,706 | 4/1990 | Meszaros | 8/652 |

OTHER PUBLICATIONS

Exhibit A, BIOS 983 (PB 79226), published 1946, pp. 98–100.
Exhibit B BIOS 983 (PB 79226), published 1946, pp. 61–62.
Exhibit F, Mellor's Modern Inorganic Chem., published 1961, pp. 512, 629.
J. Soc. Leather Technologists and Chemists, 1956, 40, pp. 226–239.

*Primary Examiner*—A. Lionel Clingman
*Attorney, Agent, or Firm*—Gerald D. Sharkin; Richard E. Vila; Thomas C. Doyle

[57] ABSTRACT

Liquid compositions of sulfur dyes in reduced form are obtained by reducing a sulfur dye in an alkaline medium to which no sulfide reducing agent has been added, preferably employing a reducing sugar as reducing agent and a sulfur dye which has been washed to remove inorganic salts therefrom.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-18, 24-26, 28-29, 36-39 and 41 is confirmed.

Claim 35 is cancelled.

Claims 19-20, 31-33 and 40 are determined to be patentable as amended.

Claims 21-23, 27, 30, 34 and 42, dependent on an amended claim, are determined to be patentable.

New claims 43-78 are added and determined to be patentable.

19. A process according to claim 2 wherein the washing of the *precipitated* sulfur dye is carried out until it contains no more than 2% inorganic salts based on the total weight of solids.

20. A process according to claim 17 wherein the washing of the *precipitated* sulfur dye is carried out until it contains no more than 2% inorganic salts based on the total weight of solids.

31. A liquid composition of a [precipitated] sulfur dye in reduced leuco form produced by the process of claim 22.

32. An aqueous composition of a dissolved [precipitated] sulfur dye in pre-reduced leuco form wherein the concentration of inorganic sulfides is less than 10%, by weight [and], the concentration of *total* inorganic [sulfates] *salts other than sulfides* is less than 3%, by weight, *and the concentration of pre-reduced sulfur dye is in the range 12 to 40%, by weight.*

33. A composition according to claim 32 wherein the concentration of inorganic sulfides is less than 7%, by weight, and the concentration of *total* inorganic [sulfates] *salts other than sulfides* is less than 1.5% by weight.

40. A composition according to claim [35] *33* wherein the content of inorganic [sulfates is less than 1.5% by weight, and the contant of inorganic] sulfides is no more than 5%, based on the total weight of the composition.

*43. A process according to claim 1 wherein the sulfur dye is CI Sulfur Black 1 or C.I. Sulfur Black 2 and the reducing agent is a sulfide which is formed in situ, no reducing agent being added to the aqueous alkaline medium.*

*44. A composition according to claim 32 wherein the concentration of pre-reduced sulfur dye is in the range 15 to 36%, by weight.*

*45. A composition according to claim 32 which is stable for at least 24 hours at −6° C.*

*46. A composition according to claim 44 wherein the concentration of inorganic sulfides does not exceed 5%, by weight.*

*47. A composition according to claim 46 wherein the concentration of total inorganic salts other than sulfides is less than 1.5%, by weight.*

*48. A composition according to claim 40 wherein the concentration of pre-reduced sulfur dye is in the range 15 to 36%, by weight.*

*49. A composition according to claim 32 wherein the concentration of total inorganic salts other than sulfides is less than 1.5% by weight.*

*50. A composition according to claim 32 wherein the concentration of total inorganic salts other than sulfides is less than 0.1% by weight.*

*51. A composition according to claim 34 wherein the concentration of total inorganic salts other than sulfides is less than 0.1% by weight.*

*52. A liquid composition of C.I. Sulfur Black 1 dye or C.I. Sulfur Black 2 dye in pre-reduced leuco form produced by the process of claim 43.*

*53. An aqueous composition of a dissolved sulfur dye in pre-reduced leuco form wherein the concentration of inorganic sulfides is less than 10%, by weight, and the concentration of inorganic sulfates is less than 3%, by weight, said composition being produced by reducing a sulfur dye in an aqueous alkaline medium to which no sodium sulfide or other sulfide reducing agent is added.*

*54. An aqueous composition according to claim 53 wherein the concentration of total inorganic salts other than sulfides is less than 3% by weight.*

*55. An aqueous composition according to claim 54 wherein the concentration of total inorganic salts other than sulfides is less than 1.5% by weight.*

*56. An aqueous composition according to claim 55 wherein the concentration of pre-reduced sulfur dye is in the range 12-40%, by weight.*

*57. An aqueous composition according to claim 54 wherein the concentration of pre-reduced sulfur dye is in the range 12-40%, by weight.*

*58. An aqueous composition according to claim 57 wherein the concentration of total inorganic salts other than sulfides is less than 0.4% by weight.*

*59. An aqueous composition according to claim 58 wherein the concentration of inorganic sulfides is in the range 1 to 5% by weight of the composition.*

*60. An aqueous composition of a dissolved sulfur dye in pre-reduced leuco form wherein the concentration of inorganic sulfides is less than 10%, by weight, and the concentration of inorganic sulfates is less than 3%, by weight, said composition being produced by reducing, in an aqueous alkaline medium, a sulfur dye which has been washed with water to remove salts therefrom.*

*61. An aqueous composition according to claim 60 wherein the sulfur dye has been washed until the total inorganic salt content, based on the weight of solids, is less than 2%.*

*62. An aqueous composition according to claim 61 wherein the sulfur dye has been washed until the total inorganic salt content, based on the weight of solids, is less than 0.6%.*

*63. An aqueous composition according to claim 62 wherein the concentration of total inorganic salts other than sulfides is less than 1.5% by weight, and the concentration of pre-reduced sulfur dye is in the range 12 to 40%, by weight.*

64. An aqueous composition according to claim 63 wherein the concentration of total inorganic salts other than sulfides is less than 0.1%, by weight.

65. An aqueous composition according to claim 64 wherein the concentration of pre-reduced sulfur dye is in the range 15 to 36%, by weight.

66. An aqueous composition according to claim 64 wherein the concentration of inorganic sulfides is in the range 0.5 to 9% by weight of the composition.

67. An aqueous composition according to claim 63 wherein the concentration of inorganic sulfides is in the range 0.5 to 9% by weight of the composition.

68. An aqueous composition according to claim 62 wherein the concentration of inorganic sulfides is in the range 0.5 to 9% by weight of the composition.

69. An aqueous composition according to claim 68 which is stable for longer than 48 hours at $-6°$ C.

70. An aqueous composition according to claim 68 wherein the concentration of inorganic sulfides is in the range 1 to 5% by weight of the composition.

71. An aqueous composition according to claim 61 which is stable for at least 24 hours at $-6°$ C.

72. An aqueous composition of a dissolved sulfur dye in prereduced leuco form wherein the concentration of inorganic sulfides is less than 10%, by weight, as determined by measuring the reduction equivalent of the composition by potentiometric titration with 0.2N cupric ammonium sulfate solution, and the concentration of inorganic sulfates is less than 3%, by weight and the concentration of pre-reduced sulfur dye is in the range 12 to 40%, by weight of the composition.

73. An aqueous composition according to claim 72 wherein the concentration of inorganic sulfides is no higher than 7%, by weight of the composition, as determined by measuring the reduction equivalent of the composition by potentiometric titration with 0.2N cupric ammonium sulfate solution.

74. An aqueous composition according to claim 73 wherein the concentration of inorganic sulfides is in the range 1 to 5%, by weight of the composition, as determined by measuring the reduction equivalent of the composition by potentiometric titration with 0.2N cupric ammonium sulfate solution.

75. An aqueous composition of a dissolved sulfur dye selected from C.I. Sulfur Black 1 and C.I. Sulfur Black 2 in prereduced leuco form which is stable for at least 24 hours at $-6°$ C. and wherein the concentration of inorganic sulfides is less than 10%, by weight, the concentration of inorganic sulfates is less than 3%, by weight, and the concentration of prereduced sulfur dye is in the range 12 to 40%, by weight of the composition.

76. A composition according to claim 75 wherein the concentration of inorganic sulfides is no higher than 7%, by weight.

77. A composition according to claim 76 which is stable for longer than 48 hours at $-6°$ C.

78. A composition according to claim 77 wherein the concentration of inorganic sulfides is in the range 1 to 5%, by weight of the composition.

* * * * *

REEXAMINATION CERTIFICATE (2802nd)

United States Patent [19]

Meszaros

[11] B2 4,917,706

[45] Certificate Issued Feb. 20, 1996

[54] LIQUID COMPOSITIONS OF PREREDUCED SULFUR DYES AND PRODUCTION THEREOF

[75] Inventor: Laszlo A. Meszaros, Charlotte, N.C.

[73] Assignee: Sandoz Ltd., Basle, Switzerland

Reexamination Request:
No. 90/003,417, Apr. 25, 1994

Reexamination Certificate for:
| | |
|---|---|
| Patent No.: | 4,917,706 |
| Issued: | Apr. 17, 1990 |
| Appl. No.: | 145,545 |
| Filed: | Feb. 1, 1988 |

Reexamination Certificate B1 4,917,706 issued Mar. 16, 1993

[51] Int. Cl.$^6$ .................... C09B 49/00; C09B 67/28; C09B 67/30
[52] U.S. Cl. .................... 8/652; 8/527; 8/650; 8/651; 8/918
[58] Field of Search .................... 8/527, 650, 651, 8/652, 918

[56] References Cited

U.S. PATENT DOCUMENTS

| | | | |
|---|---|---|---|
| 1,095,237 | 5/1914 | Schmidt et al. | 8/524 |
| 2,558,245 | 6/1951 | Grant | 8/37 |
| 3,372,167 | 3/1968 | Moll | 260/315 |

FOREIGN PATENT DOCUMENTS

| | | |
|---|---|---|
| 459281 | 1/1946 | Belgium . |
| 88392 | 2/1895 | Germany . |
| 91720 | 2/1895 | Germany . |
| 94501 | 6/1896 | Germany . |
| 27379 | of 1911 | United Kingdom . |
| 857429 | 12/1960 | United Kingdom . |
| 1262062 | 2/1972 | United Kingdom . |
| 1428577 | 3/1976 | United Kingdom . |
| 1579994 | 11/1980 | United Kingdom . |

OTHER PUBLICATIONS

Venkataraman's *Chemistry of Synthetic Dyes* vol. 7 pp. 51–52, Academic Press, N.Y. 1974 *no month available.

*The Colour Index* 3rd. Edition p. 4436 (vol. 4) 1971 *no month available.

*Primary Examiner*—Linda Skaling Therkorn

[57] ABSTRACT

Liquid compositions of sulfur dyes in reduced form are obtained by reducing a sulfur dye in an alkaline medium to which no sulfide reducing agent has been added, preferably employing a reducing sugar as reducing agent and a sulfur dye which has been washed to remove inorganic salts therefrom.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 4, lines 33–41:

The order of addition of the components is not critical. All of the components, i.e. dye, reducing sugar, alkali, water and [optical] *optional* solubility-increasing agent may be mixed together and then heated. Preferably, however, the components other than the reducing sugar are combined and heated to 60° to 110° C., preferably 80° to 95° C., and the reducing agent is then added. Heating is continued preferably with agitation, until all of the components have gone into solution.

AS A RESULT OF REEXAMINATION, IT HAS BEEN DETERMINED THAT:

The patentability of claims 1–27, 29–34, 36–47, and 49–52 is confirmed.

Claim 35 was previously cancelled.

Claims 28, 48, 53, 60–62, and 68–71 are cancelled.

Claims 54, 63, 72, and 75 are determined to be patentable as amended.

Claims 55–59, 64–67, 73, 74 and 76–78, dependent on an amended claim, are determined to be patentable.

New claim 79 is added and determined to be patentable.

54. An aqueous composition [according to claim 53] *of a dissolved sulfur dye in pre-reduced leuco form wherein the concentration of inorganic sulfides is less than 10%, by weight, and the concentration of* total inroganic salts other than sulfides is less than 3%, by weight, *said composition being produced by reducing a sulfur dye in an aqueous alkaline medium to which no sodium sulfide or other sulfide reducing agent is added.*

63. An aqueous composition [according to claim 62] *of a dissolved sulfur dye in pre-reduced leuco form wherein the concentration of inorganic sulfides is less than 10% by weight and the concentration of* total inorganic salts other than sulfides is less than 1.5%, by weight, and the concentration of pre-reduced sulfur dye is in the range 12 to 40%, by weight, *said composition being produced by reducing, in an aqueous alkaline medium, a sulfur dye which has been washed with water to remove salts therefrom until the total inorganic salt content, based on the weight of solids, is less than 0.6%.*

72. An aqueous composition of [a] *dissolved* [sulfur] *C.I. Sulfur Black 1 or C.I. Sulfur Black 2* dye in prereduced leuco form wherein the concentration of inorganic sulfides is less than 10%, by weight, as determined by measuring the reduction equivalent of the composition by potentiometric titration with 0.2N cupric ammonium sulfate solution, and the concentration of inorganic sulfates is less than 3%, by weight and the concentration of prereduced sulfur dye is in the range 12 to 40%, by weight of the composition, *which composition contains an alkali selected from the group consisting of alkali metal hydroxide, alkali metal carbonate, alkali metal phosphate and sodium metabisulfite but does not contain an agent which further increases the solubility of the prereduced dye therein.*

75. An aqueous composition of a dissolved sulfur dye selected from C.I. Sulfur Black 1 and C.I. Sulfur Black 2 in prereduced leuco form which is stable for at least 24 hours at $-6°$ C. and wherein the concentration of inorganic sulfides is less than 10%, by weight, the concentration of inorganic sulfates is less than 3%, by weight, and the concentration of prereduced sulfur dye is in the range 12 to 40%, by weight of the composition, *which composition contains an alkali selected from the group consisting of alkali metal hydroxide, alkali metal carbonate, alkali metal phosphate and sodium metabisulfite but does not contain an agent which further increases the solubility of prereduced dye therein.*

79. *An aqueous composition according to claim 72 wherein the concentration of inorganic sulfides does not exceed 5%, by weight of the composition, as determined by measuring the reduction equivalent of the composition by potentiometric titration with 0.2N cupric ammonium sulfate solution.*

* * * * *